No. 857,383. PATENTED JUNE 18, 1907.
C. BURGESS, Jr.
VEHICLE SPRING.
APPLICATION FILED JAN. 14, 1907.
2 SHEETS—SHEET 1.
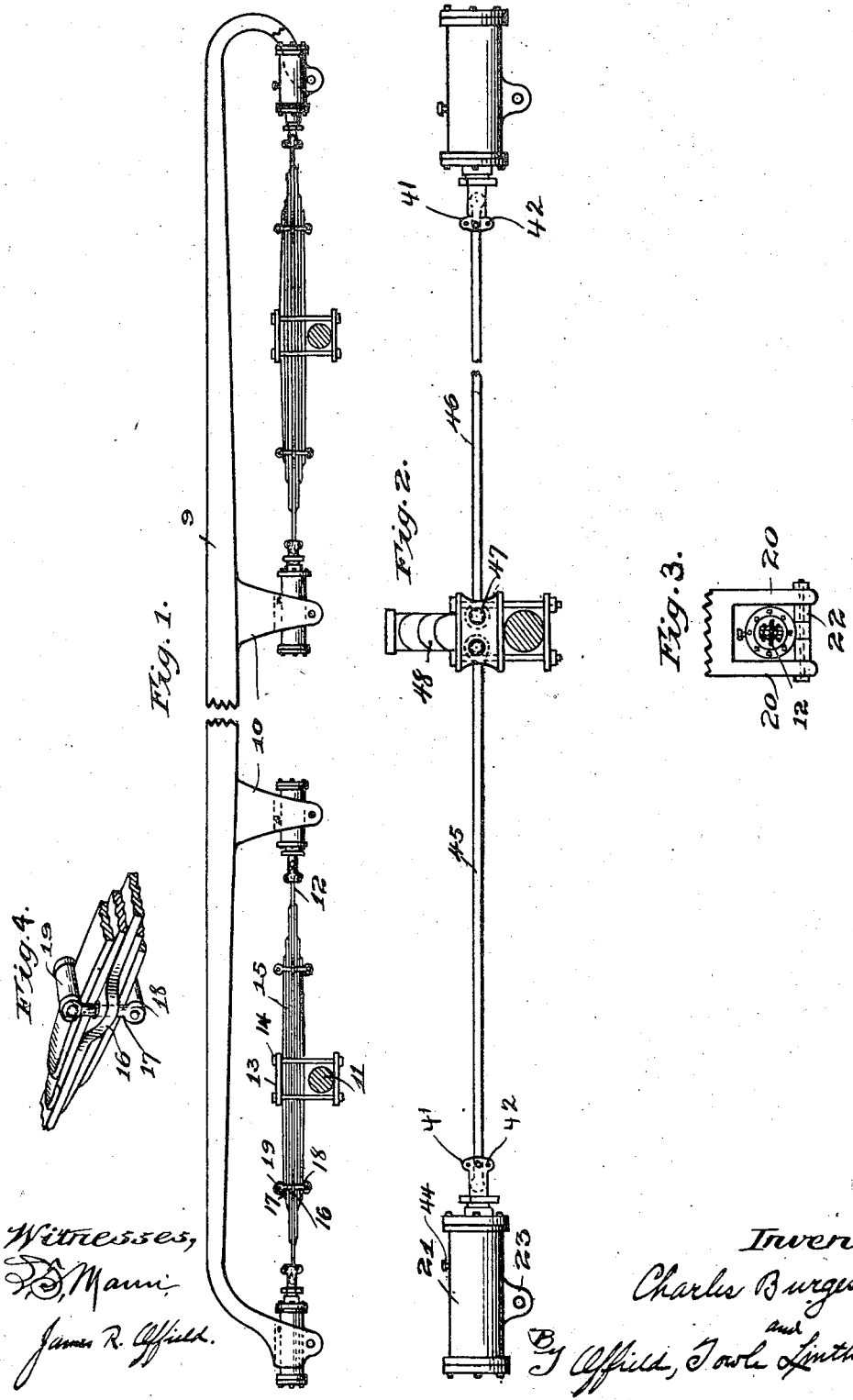

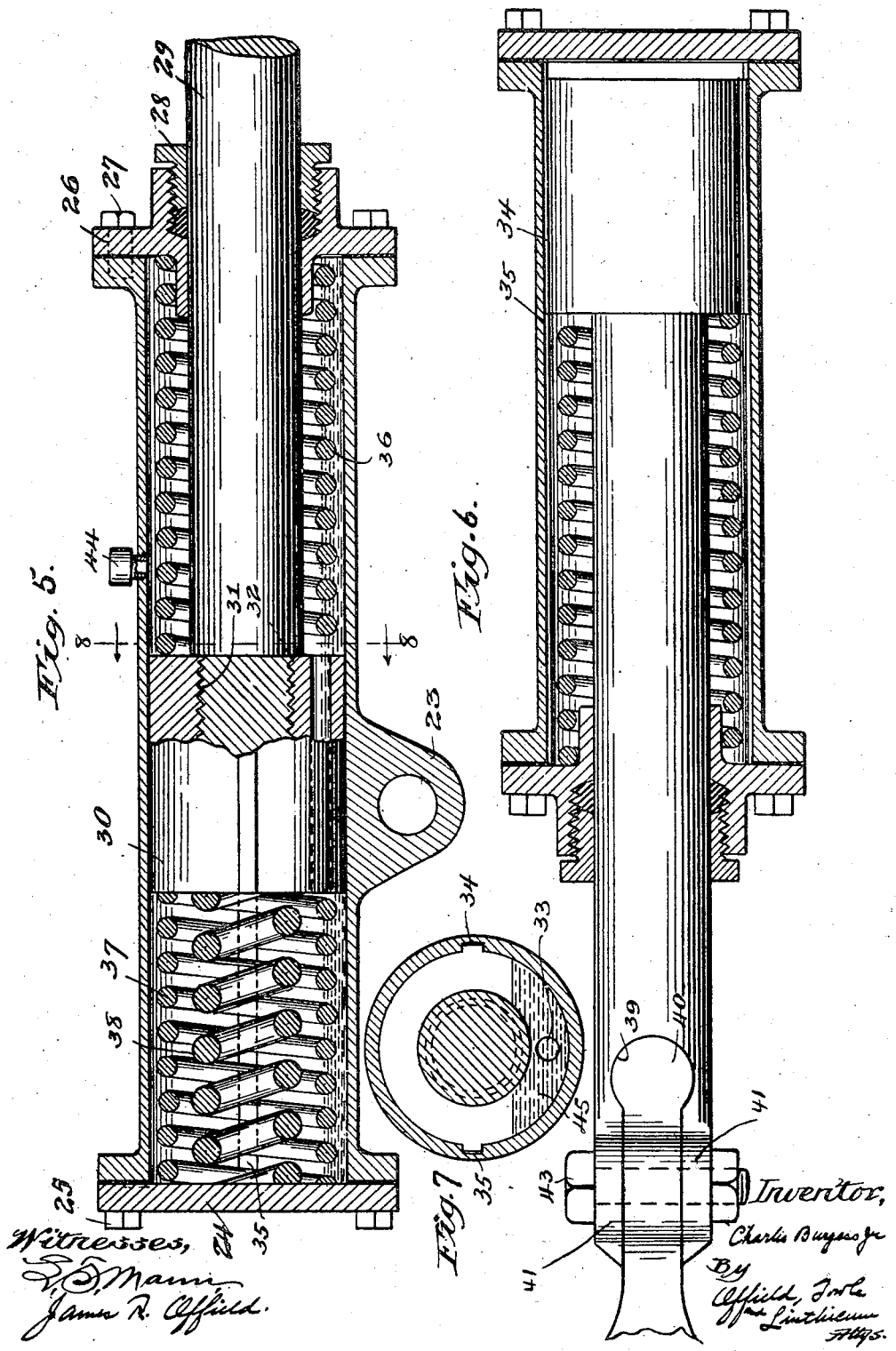

UNITED STATES PATENT OFFICE.

CHARLES BURGESS, JR., OF WENONA, ILLINOIS.

VEHICLE-SPRING.

No. 857,383.

Specification of Letters Patent.

Patented June 18, 1907.

Application filed January 14, 1907. Serial No. 352,239.

*To all whom it may concern:*

Be it known that I, CHARLES BURGESS, Jr., a citizen of the United States, residing at Wenona, in the county of Marshall and State of Illinois, have invented certain new and useful Improvements in Vehicle-Springs, of which the following is a specification.

The invention relates in general to springs for any type of vehicle, such as railway cars or the like, and it is especially adapted for use upon automobiles where a rough or uneven surface is traversed at a high rate of speed.

The object of the invention is to provide a straight spring, that is, a bar spring, although laminations may be used on either side of the bar, which is distinguished from the ordinary form of elliptic spring, either half or full elliptic, in that it always affords the same tension below the horizontal line of the axle as above the horizontal line thereof without impairing its elasticity, resiliency or strength.

Among the many advantages accomplished by this form of construction, which serves equally well for what is commonly known as a shock resister as for a spring, is that it prevents the car from having a lunge either forward or backward; sidewise distortion of the springs, and restrains the car body from rebounding in that the tension of the buffer springs constantly tend to straighten out the main spring which permits at no time a free spring construction.

There are many other detailed advantages of the structure which will be more fully described, and are shown in the accompanying drawings in which, Figure 1 is a side elevation of my spring construction applied to the frame of a vehicle, the frame being broken away intermediate of its length; Fig. 2 is a modified form of construction; Fig. 3 is a detailed view of one of the depending hangers on the frame; Fig. 4 is a perspective elevation of a clip for maintaining the alinement of the laminations or leaves upon the main spring; Fig. 5 is a longitudinal sectional elevation of one of the cylinders; Fig. 6 is a longitudinal sectional plan of one of the cylinders, and showing the method of securing the piston to the spring; and Fig. 7 is a cross-section on line 8—8 of Fig. 6.

Referring now more particularly to the drawings, 9 represents the frame of a vehicle having the depending hangers 10, in the preferred form, formed integral therewith, which will be more fully described hereafter. The axle 11 of the vehicle, to which the wheels therefor are secured, is attached to the vehicle spring 12 by means of the plates 13 and bolts 14, which is a common form of construction.

The vehicle spring may consist of simply a single spring, as shown at 12, or it may consist of a single spring with leaves or laminations secured thereto, as shown at 15, the number of laminations that are employed depending entirely upon the strength of the spring required, which is determined according to the static weight of the car body, or the maximum weight of the car body according to the preferred form of computing what the strength of any spring should be. If laminations are interposed on either side of the main or central spring 12 I provide the same with straps 16 which are preferably formed integral therewith, and on either side thereof through which vertical guides 17 are slidably mounted, having eyes 18 at either end thereof in which the roller bearings 19 are journaled and are normally in contact with the upper and lower leaves. When the spring is deflected there is a movement of the laminations either forward or backward longitudinally of the main spring, and by the employment of the vertical bars the laminations or leaves are kept in alinement during this movement and are greatly assisted by the roller bearings which eliminate the friction between the leaves to a great extent.

Referring now to the depending hangers 10, they are preferably constructed, as shown in Fig. 3, wherein they are provided with the depending lugs 20 between which a cylinder 21 is secured by a bolt 22 which passes through eyes at the lower portions of the depending lugs 20, as well as through the apertured lug 23 preferably formed integral with the cylinder casing. This construction gives the cylinder a free vertical rocking movement between the depending lugs 20. The cylinder 21 is constructed similar to the ordinary cylinder in that it has a head 24 secured to one end thereof by means of the bolts 25, as well as a head 26 secured to its other end by means of the bolts 27, the head 26 being apertured to receive a packing ring 28 through which the piston rod 29 is adapted to slide. Adjustably mounted upon the piston rod 29 is the piston head 30, the adjustable feature being accomplished by means of the piston rod being threaded, as shown at 31, and adapted to co-operate with a bore provided with a female thread 32 within the piston head. The piston head is provided with a longitudinal slot 33, for a purpose hereinafter described, and to prevent rotation of the piston head within the cylinder I provide the same with a key 34 that is preferably formed integral therewith and adapted to co-operate with a key-way or slot 35 formed within the casing of the cylinder. Interposed between the piston head and the head 26 of the cylinder is a buffer spring 36, and it is not essential that I confine myself to the use of one buffer spring as many may be employed according to the dimensions of the cylinder as well as the desired tension required; the size or number of buffer springs being governed entirely by the end tension sought to be procured and in the accompanying drawing I have therefore only shown one buffer spring interposed between the aforementioned parts.

The construction just described is the form of cylinder that is used upon the forward end of each spring, but it is essential to a perfect spring construction, to afford the best resiliency without being too flexible to provide on the rear end of each spring a cylinder constructed of slightly different form, which is as follows: Interposed between the cylinder head 30 and the head 24 there is a spring 37, and possibly an additional spring 38, according to the tension required, which normally press the cylinder head 30 away from the head 24. This spring or series of springs are placed at the rear end of each main spring of the vehicle for the reason that when an obstruction is encountered in the road, such as a mound or the like or going through a heavy mud, the tendency would be to force the axle rearwardly and unless the spring 36 in the forward cylinder was of exceptional strength the axles might be forced out of alinement, which would impair greatly the driving efficiency of a car, such as a motor vehicle, if the forward and rear axles are not maintained in perfect alinement.

Fig. 6 shows the form of cylinder and buffer spring construction that is used at the forward end of each spring, (the forward end as used throughout the specification meaning the forward end of the vehicle), while the structure as shown in Fig. 5 is the form of cylinder that, in the preferred form, I employ at the rearward end of each spring. The piston-rod of each cylinder extends out and beyond the piston-head and is provided with the socket joint 39 adapted to co-operate with the ball joint 40 formed at either end of the main spring 12, and to further make a construction wherein the piston rod and the spring are rigidly secured together I provide ears 41 upon the piston rod 29 that are preferably formed integral therewith and extend both above and below the horizontal axis of the spring 12. The ears are suitably apertured, as shown at 42, to receive bolts 43 that are interposed both above and below the spring 12 and thereby prevents any vertical movement between the piston rod and spring 12, while the ball and socket joint prevents any longitudinal movement relative to each other. The vehicle, as is the general practice, is provided with four springs, one at either end of its respective axles, and consequently in my construction eight cylinders are employed for each vehicle, the cylinder as shown in Fig. 5 being used for the rearward set of cylinders for each axle, and the cylinder as shown in Fig. 6 being employed for the forward set of cylinders for each axle. Each cylinder is provided with an oil plug 44 in order that oil may be inserted within the cylinder which not only serves as a lubrication but also acts as a fluid brake therein, and in Fig. 7 I have shown by the dotted lines 45 oil within the same. It is obvious that the cylinder is not completely filled with oil, but only a small amount being used, and upon a forward or backward movement of the piston head the oil is forced on either side thereof through the longitudinal aperture or sluice 33.

From the foregoing description it can be readily seen that my construction affords an exceptionally resilient spring construction wherein the spring may be flexed on either side of the horizontal line of the axle, and have the same tension flexed downward as when flexed upward, the tendency of the buffer springs being to always center the main spring in its vibrating movement and thereby the objectionable feature of the ordinary spring construction is done away with in that when the elliptic spring is employed when an obstruction is encountered the elliptic spring is compressed and tends to rebound and throw the body of the vehicle upward, but in the construction herein shown the buffer springs constantly tend to center the main spring and there is no point during the vibrating movement that there is a free spring, meaning a spring without tension. Furthermore, when any slight obstruction is encountered in the road the shock is absorbed by the buffer spring in the forward cylinders, and consequently is not transmitted to the frame of the vehicle in a vertical manner, but only in a slight longitudinal manner. When a heavier obstruction is encountered by the wheel of the vehicle the spring member 12 will be flexed upward compressing the buffer springs, and when the obstruction is passed over the buffer springs will tend to immediately straighten the main spring and stop the vibration thereof.

In Fig. 2 a modified form of construction is shown wherein instead of employing the straight spring 12 I substitute the two rigid bars 45 and 46 which are connected to the pistons in the same manner that the springs are connected, but which are pivoted to a casing 47 secured to the axle of the vehicle in the same manner as the spring 12 and its laminations would be secured thereto. In this form of construction I employ either a straight spring or an elliptic spring 48 that is interposed above the casing 47 and arranged transversely relative to the vehicle frame. By this construction a much less amount of spring metal may be employed for the reason that the transversely arranged springs need not be very large, and the buffer springs are of a stronger type than those ordinarily used in the construction previously described, but my preferred form of invention is the construction herein more fully shown.

It is obvious from the foregoing description that I do not limit myself to a construction wherein the rear cylinders are provided with springs 37 for the cylinders and the springs therein may all be constructed alike, nor do I limit myself to a construction wherein the cylinders are mounted to rock upon the frame, this construction being simply the preferred form and one that eliminates considerable friction that would come upon the piston rod if the cylinders were rigidly attached to the frame and a universal joint connection made between the piston rod and the ends of a spring inside of the rigid connection as herein shown, and therefore without confining myself to the exact details of construction,

I claim:

1. In a spring construction for a vehicle, the combination of an axle, a frame, a spring secured between its ends to said axle and lying in a horizontal plane and buffer springs secured to said frame and to the ends of said spring, the longitudinal axial line of said spring and buffer springs being in the same horizontal plane, substantially as described.

2. In a spring construction for a vehicle, the combination of an axle, a frame, a spring secured between its ends to said axle, rocking cylinders secured to said frame, pistons within said cylinders connected to the ends of said spring, and buffer springs backing said pistons, the normal tension of said buffer springs being outward from the ends of said spring, substantially as described.

3. In a spring construction for a vehicle, the combination of an axle, a frame, a spring secured between its ends to said axle, and lying in a horizontal plane, rocking cylinders secured to said frame and lying in the same horizontal plane as said spring, pistons within said cylinders rigidly connected to the ends of said spring, and buffer springs backing said pistons, the normal tension of said buffer springs being outward from the ends of said spring, substantially as described.

4. In a spring construction for a vehicle, the combination of an axle, a frame, a spring having its central portion secured to the axle, rocking cylinders secured to said frame and adapted to contain oil, piston rods within said cylinders having piston heads each provided with a longitudinal aperture for the passage of oil on either side thereof, buffer springs surrounding said piston rods, the opposite ends of said springs being rigidly connected to said piston rods, substantially as described.

5. The combination with a spring comprising a series of leaves, of vertical guide posts slidably mounted on both sides thereof, bearings journaled in said guide posts and in contact with the outer surfaces of the upper and lower leaves of said spring, substantially as described.

CHARLES BURGESS, Jr.

Witnesses:
 FREDERICK C. GOODWIN,
 JAMES R. OFFIELD.